United States Patent [19]

Naito

[11] 4,427,995
[45] Jan. 24, 1984

[54] FAIL-SAFE CATV SYSTEM CENTER FACILITY

[75] Inventor: Akihiko Naito, Tokyo, Japan

[73] Assignee: Pioneer Electronic Corporation, Tokyo, Japan

[21] Appl. No.: 329,914

[22] Filed: Dec. 11, 1981

[30] Foreign Application Priority Data

Dec. 22, 1980 [JP] Japan ................... 55-182663

[51] Int. Cl.³ .............................................. H04N 7/10
[52] U.S. Cl. ........................................ 358/86; 455/3; 455/5; 455/8
[58] Field of Search ............. 455/2, 3, 4, 5, 8, 6; 358/84, 86; 340/825.2, 825.54

[56] References Cited

U.S. PATENT DOCUMENTS 2,699,495  1/1955  Magnuski et al. ............... 455/8
3,639,686  2/1972  Walker et al. ................... 358/86
3,869,564  3/1975  Colody ............................ 455/3
4,156,847  5/1979  Tazawa et al. ................... 455/5

Primary Examiner—Joseph A. Orsino, Jr.
Attorney, Agent, or Firm—Sughrue, Mion, Zinn, Macpeak & Seas

[57] ABSTRACT

A fail-safe CATV system center facility in which abnormalities in a normal down-data signal transmitter are automatically corrected for so that there is no loss of reception at the terminal units. FM and AM detectors detect the presence or absence of the normal FSK data signal. The outputs of the FM and AM detectors are AND'ed together then delayed to control the switch state of a switch which selects between the outputs of the normal down data signal transmitter and a back-up transmitter for coupling through to the cable system. The back-up transmitter produces a clock signal which is obtained by modulating a carrier signal having the same frequency as that of the normal down data signal, preferably a frequency shift keyed signal.

3 Claims, 2 Drawing Figures

FAIL-SAFE CATV SYSTEM CENTER FACILITY

BACKGROUND OF THE INVENTION

The present invention relates to a CATV system in which a single central facility (hereinafter referred to as "a center" when applicable) is used to transmit video signals to a number of terminal units and two-way data communication is effected therebetween. More particularly, the invention relates to a CATV system in which transmitter difficulties in the center do not prevent normal reception at the terminal units, specifically, when a primary transmitter in the center which transmits a "down" data signal (which is a data signal transmitted from the center) is in an abnormal state, a back-up signal transmitter is operated so that the system can operate normally at all times.

In a CATV system, a center is coupled through cables to terminal units. The center outputs a "down" data signal, while each terminal unit outputs an "up" data signal. That is, two-way data communication is carried out between the center and the terminal units, besides the normal video signal which carries the television programs.

A computer, a transmitter/receiver unit, etc. are provided in the center. The center carries out polling of the terminal units at various times and transmits a "down" data signal, for example as an FSK (frequency shift keying) signal, to control various functions at the terminal units and to detect the operating conditions of the terminal units. Data representative of channels which are utilized by subscribers are reported to the center from the terminal units via "up" data signals. When a subscriber views a chargeable program, an appropriate charge is made. However, if a dishonest subscriber connects a filter which eliminates the data signals between the center and the terminal unit in his home, then it is no longer possible to calculate a charge for a chargeable program.

In order to eliminate this drawback, the system may be designed that, when a terminal unit does not receive a "down" data signal for a predetermined period of time (for instance three minutes), the detector circuit in the terminal unit detects this condition and then stops the operation of the video signal receiving circuit. Alternatively, if the center receives no "up" data signal (representing the fact that a subscriber is viewing a chargeable program) for a predetermined period of time, that is, when the terminal unit does not answer the center for a particular period of time, the center transmits an instruction signal to the terminal unit to stop the operation of the video signal receiving circuit so that the subscriber can no longer use the terminal unit.

If, in this system, the "down" data signal transmitting section in the center becomes out of order and cannot transmit the "down" data signal normally or correctly, then a serious difficulty occurs in that all of the terminal units cannot receive video signals. This trouble may be eliminated by employing a technique whereby a plurality of computers and transmitter/receiver systems are provided in the center, and if one system becomes out of order, then another system is used. However, this technique is disadvantageous in that it is considerably expensive.

A typical example of a CATV system will be described with reference to FIG. 1. In this system, terminal units are provided, for instance, in several ten thousands of homes 2 for a single center facility 1. The center 1 and the terminal units form one set or group. The center 1 is connected through coaxial cables to the terminal units in the homes 2. A main cable 3 extends from the center 1. Main cable amplifiers 4 and branching units 5 are provided along the main cable 3 at predetermined points. Plural branch cables 6 extend from each branching unit 5. Extension cable amplifiers 7 and taps 8 are provided along each branch cable 6 at predetermined positions. Plural auxiliary branch cables 9 extend from each tap 8 with the auxiliary branch cables 9 leading into the homes 2. Provided in each home 2 is a terminal unit 28 including a converter 10, a television set 11 and a control box 12. The end of the auxiliary branch cable 9 is connected to the converter 10 which is in turn connected to the television set 11 and the control box 12. In this fashion, the main cable from the center 1 spreads branches repeatedly connecting the center 1 to the terminal units in the homes 2.

A signal receiving antenna 13 is installed outside the center 1. The antenna 13 is connected to a demodulator 15 in a source group 14. The source group 14 includes a video disc player 16, a video tape recorder 17, a studio 18 and other such equipment as desired. Signals from the source group 14 are applied to a modulation and transmission section 19. The section 19 includes two systems. One of the two systems includes an IF modulation circuit 20, a scrambling circuit 21, and an up-converter circuit 22 while the other includes an IF modulation circuit 23 and an up-converter 24. The outputs of the up-converter circuits 22 and 24 are connected to the main cable 3. The main cable 3 is connected to a transmitter-receiver 25 which communicates with the converters 10. The transmitter-receiver 25 is connected to a computer 26 which is connected to peripheral equipment 27 such as a printer and a display unit.

The operation of the CATV system thus constructed will now be described. First, the switch of the television set is turned on and the television set is set to a predetermined designated channel which is preferably not used by local over the-air stations. The control box 12 is then operated so that the frequency of a desired channel to be received is converted into that of the designated channel by the converter 10. The channels which can be selected by the control box can be classified into a group A channels of which television signals are received over the air and retransmitted without modification, a group B of channels of independent programs provided free of charge and a group C of channels of chargeable programs. Each group has several corresponding channels. Typically, selection can be made from about twenty to thirty channels.

For the group A, a television signal received by the signal receiving antenna is demodulated by the demodulator 15 and then applied to the modulation and transmission section 19. The signal is modulated by the IF modulation circuit 23. The frequency of the signal thus modulated is increased to a predetermined value by the up-converter circuit 24. Thus, the television signal received is changed into a signal upon a desired channel which is then transmitted through the main cable 3, the branch cables 6 and the auxiliary branch cable 9 to the television sets 11.

The independent programs of group B are for instance weather forecast programs and news programs. A television signal provided by the video disc player 16 or the video tape recorder 17 or a television signal from a live program produced in the studio 18 is modulated and frequency-multiplied by the IF modulation circuit 23 and the up-converter circuit 24 into a television signal upon the desired channel which is applied to the main cable 3. The independent programs are free of charge irrespective of the number of times of television signal reception or the period of time of television signal reception. Each subscriber can receive the television signals for a basic monthly charge.

The chargeable programs of group C are typically new movie programs, special programs, or the like. A television signal provided by the video disc player 16 or the video tape recorder 17, or a television signal from a live program produced in the studio 18 is modulated by the IF modulation circuit 20. A scrambling synchronizing signal of predetermined form is added to the video signal in the television signal by the scrambling circuit 21. Because of this signal, if the television signal is received only as it is by the television set, it is impossible to reproduce normal pictures on the television set. The television signal thus treated is applied to the up-converter 22 where its frequency is increased to the frequency of a designated channel. The television signal thus processed is supplied to the main cable 3.

Upon receiving the television signal of the chargeable program by the television set in each home 2, the scrambled television signal is converted into a normal video signal by the converter 10 so that normal pictures can be observed on the television set 11. Whenever a chargeable program is received, a predetermined fee is charged to the subscriber. The sum of the monthly basic charge and the special use fee is billed to the subscriber.

In order to determine whether received programs are free of charge or not, it is necessary to detect what subscribers have used what channels for particular periods of time. For this purpose, the transmitter-receiver 25 outputs a retrieving signal at predetermined time intervals to address the converter 10 in each terminal unit with an address number assigned to that particular terminal unit to determine if a group C channel is being used at the retrieval time. In response to this, the converter 10 sends to the transmitter-receiver 25 an answering signal representative of the channel which is in use at the retrieval time. The charge data transmitted and received by the transmitter-receiver 25 is arranged and stored by the computer 26 and displayed or printed out by the peripheral equipment 27. As the retrieving signal is transmitted at fixed predetermined time intervals of typically several seconds to several tens of seconds, audience ratings can also be immediately calculated.

A subscriber can choose which programs he wishes to view by operating his control box 12 while watching the television set 11. The subscriber's choice or answer is encoded and sent through the coaxial cables to the center 1.

SUMMARY OF THE INVENTION

In view of the above-described difficulties, the invention provides a CATV system having an improved reliability in which a back-up signal transmitter for outputting a clock signal, which is obtained by modulating a carrier signal having the same frequency as that of a "down" data signal according to the same modulation technique as that of the "down" data signal, is provided in the center. When the "down" data signal is abnormal, the back-up signal transmitter transmits the clock signal instead of the "down" data signal to the terminal units so that the terminal units can receive video signal at all times.

DESCRIPTION OF THE PREFERRED EMBODIMENTS

Figure 1:
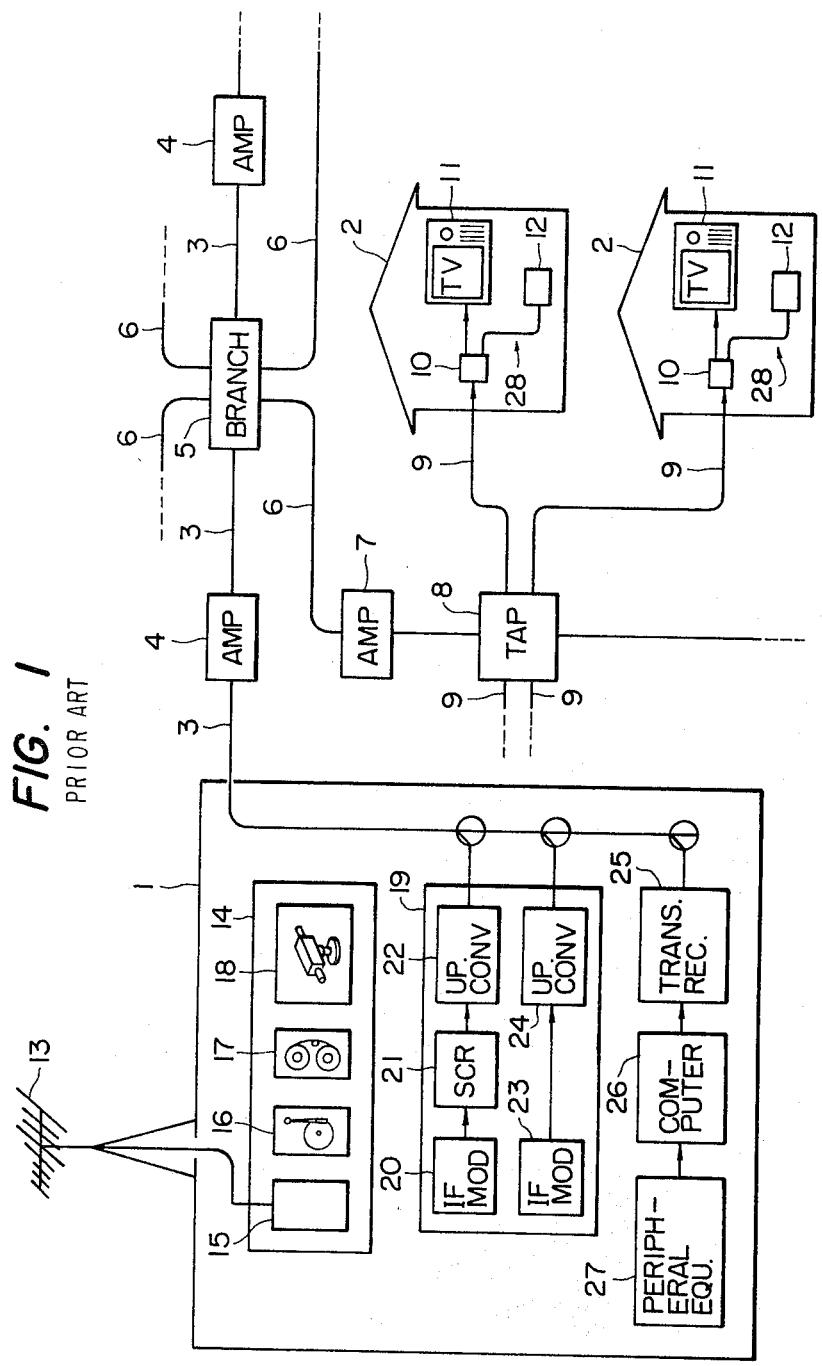
FIG. 1 is an explanatory diagram outlining the arrangement of a known CATV system.
Figure 2:
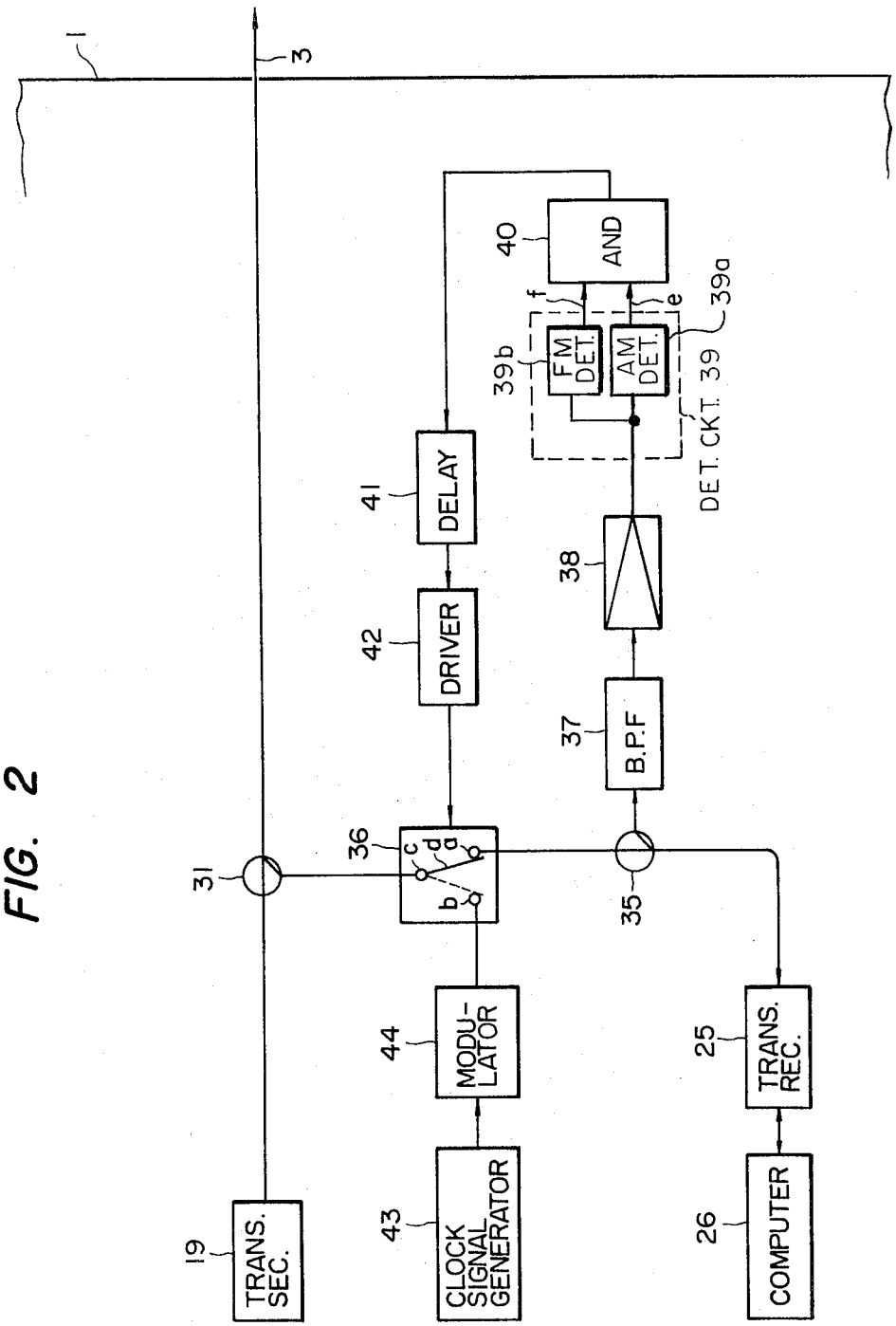
FIG. 2 is a block diagram of a preferred embodiment of a CATV system center of the invention.

FIG. 2 shows a preferred embodiment of the invention, specifically, improved portions of the center. A video transmission section 19 is here connected to the main cable 3 through a coupler unit 31 in order to transmit video signals to the aforementioned terminal units 28. A computer 26 and a transmitter-receiver 25 are connected to each other, also as in the prior art system. The transmitter-receiver 25 is connected through a signal splitter 35 to a terminal a of a switch circuit 36.

The coupler 31 has one input connected to a terminal c of the switch circuit 36. An armature d connected to the terminal c can be set to either the terminal a or the terminal b of the switch circuit 36. In practice, the armature d is operated by means of a coaxial relay or the like.

A bandpass filter 37 for transmitting a "down" data signal is connected to one output of the splitter 35. A detection circuit 39 is connected through an amplifier 38 to the bandpass filter 37. The detection circuit 39 outputs an AM detection output signal e, which is obtained by subjecting a carrier signal to AM detection, and a clock signal f which is obtained by subjecting an FSK signal to FM detection. The two signals e and f are applied to an AND gate 40. The output of the AND gate 40 is applied through a delay circuit 41 to a driver circuit 42. The operation of the switch circuit 36 is controlled by the driver circuit 42. A clock signal generating circuit 43 for generating a clock signal having a predetermined period is connected to a modulator 44 which modulates the clock signal as an FSK signal. The terminal b of the switch circuit 36 is connected to the output of the modulator 44.

The operation of the above-described CATV system will be described.

When the computer 36 and the transmitter-receiver 25 operate normally and output the normal "down" data signal, the "down" data signal is passed through the splitter 35. The "down" data signal thus generated is applied through the bandpass filter 37 to the amplifier 38 where it is amplified.

The detection circuit 39 includes both an AM detector 39a for detecting the presence or absence of the carrier signal of the "down" data signal and an FM detection circuit 39b for detecting the presence or absence of the clock signal. These two detectors thus provide the AM detection output signal e and the clock signal f. The signals e and f are applied to the AND gate 40, the output of which is applied to the delay circuit 41. When both of the signals e and f are present, the delay circuit 41 outputs no signal. Accordingly, the armature d of the switch circuit 36 is maintained at the terminal a, and therefore the "down" data signal from the transmitter-receiver 25 is transmitted through the splitter 35, the switch circuit 36 and the coupler 31 to the main cable 3 and to the terminal units 28. Also, an "up" data signal from each terminal unit 28 can then be transmitted to the transmitter-receiver 25 and from there to the computer 26 taking the above-described path in the opposite direction. Thus, two-way data communications are carried out.

If the "down" data signal is abnormal because the computer 26 and the transmitter-receiver 25 are out of order for instance, at least one of the AM detection output signal e and the clock signal f are not outputted by the detection circuit 39, and accordingly the AND gate 40 provides no output. One or two minutes after the provision of the output from the AND gate 40 is suspended, the delay circuit 41 supplies a detection signal representative of the abnormal condition to the driver 42. As a result, the driver 42 operates the switch circuit 36 so that the armature d is tripped over to the terminal b. Therefore, the FSK signal, which is generated by subjecting the clock signal from the clock signal generating circuit 43 to modulation by the modulator 44, is applied through the switch circuit 36 and the coupler 31 to the main cable 3 so that the FSK signal is then transmitted to the terminal units 28 on a carrier signal having the same frequency as that of the "down" data signal. As the FSK signal is received by each terminal unit 28, the terminal units 28 can continue to receive video signals from the transmission section 19.

The delay circuit 41 is provided to permit operation without operating the switch circuit 36 in the case when the "down" data signal is interrupted momentarily or becomes abnormal for an extremely short time. That is, the delay circuit 41 is provided so that normal operation of the system will be interrupted only when an abnormal condition continues for some time.

When the computer 26 and the transmitter-receiver 25 again are capable of transmitting normal "down" data signals, the delay circuit 41 detects the fact that the computer 26 and the transmitter-receiver 25 are in the normal condition and provides no output. As a result, the driver 42 causes the switch circuit to be set back to its normal state so that the transmitter-receiver 25 is coupled to the terminal units. Thus, two-way data communications are effected again.

With the CATV system according to the invention arranged as described above, if the "down" data signal from the center becomes abnormal, the back-up transmitter outputs a clock signal which is obtained by subjecting a carrier signal having the same frequency as that of the "down" data signal to the same modulation as that of the "down" data signal. Accordingly, the terminal units can continuously receive the video signals without interruption.

It is unnecessary to provide in the center a plurality of systems of "down" data signal transmitters each having the same function. Therefore, the back-up system can be simple in arrangement and can therefore be manufactured at low cost.

I claim:

1. In a CATV system in which a central facility is coupled through cables to a number of terminal units and two-way data communication is effected therebetween, said central facility comprising:
   normal down data signal transmitting means;
   abnormality detecting means connected to said data signal transmitting means for detecting a down data signal abnormality in a down data signal produced by said down signal data tramsmitting means, said abnormality detecting means including an FM detector responsive to the down data signal, an AM detector, responsive to an information carrier signal and AND gate means having first and second inputs coupled, respectively, to outputs of said FM detector and said AM detector, an output of a AND gate means being coupled to control a switching position of said switching means;
   back-up transmitting means for producing a clock signal by modulating a carrier signal to form a frequency shift keyed signal having the same frequency as that of said down data signal; and
   said switching means for stopping, when said abnormality detecting means detects that said down data signal is in an abnormal condition, transmission of said down data signal and coupling said clock signal fromm said back-up transmitting means to said cables, wherein when said down data signal is abnormal, clock signals for down data signals are transmitted to said terminal units by said back-up transmitting means.

2. The CATV system as claimed in claim 1 wherein said abnormality detecting means further comprises a bandpass filter receiving an input from an output of daid normal down signal transmitting means and amplifier means having an input coupled to an output of said bandpass filter means and an output coupled to an input of said FM detector and said AM detector.

3. The CATV system as claimed in claim 1 or 2 wherein said abnormality detecting means further comprises a delay circuit having an input coupled to an output of said AND gate means and an output coupled to a control input of said switching means for controlling a switch position of said switching means.

* * * * *